United States Patent [19]
Dymsza

[11] 3,904,774

[45] Sept. 9, 1975

[54] FOOD PRESERVING PROCESS

[75] Inventor: Henry A. Dymsza, East Greenwich, R.I.

[73] Assignee: Board of Regents for Education of the State of Rhode Island, Providence, R.I.

[22] Filed: Aug. 17, 1973

[21] Appl. No.: 389,242

Related U.S. Application Data

[63] Continuation of Ser. No. 174,191, Aug. 23, 1971, abandoned.

[52] U.S. Cl. ................ 426/321; 426/426; 426/429; 426/433
[51] Int. Cl.² .......................................... A23D 7/00
[58] Field of Search .......... 426/151, 321, 323, 335, 426/442, 443; 34/9, 310, 426, 429, 377

[56] References Cited
UNITED STATES PATENTS
3,485,639  11/1969  Knightly ............................ 426/151

Primary Examiner—Samih N. Zaharna
Assistant Examiner—Ernest G. Therkorn
Attorney, Agent, or Firm—Thompson, Birch, Gauthier & Samuels

[57] ABSTRACT

A process for simultaneously dehydrating and infusing a preservative into pieces of moisture-bearing food product comprising treating such food product in a liquid bath containing an alkylene glycol preservative such as propylene glycol or the like. The process utilizes the presence of the natural cell-moisture content of the food product to maintain the cells in a condition suitable to facilitate the transport of an effective quantity of glycol preservative throughout the pieces of food being treated.

13 Claims, No Drawings

FOOD PRESERVING PROCESS

The Government has rights in this invention pursuant to Grants NSF GH-44 and GH-99 with the National Science Foundation.

CROSS-REFERENCE TO RELATED APPLICATIONS

This application is a continuation of U.S. application Ser. No. 174,191 by Henry A. Dymsza, filed Aug. 23, 1971, and now abandoned.

BACKGROUND OF THE INVENTION

The population of the world is increasing rapidly. Accompanying this population growth is the attendant problem of providing adequate food for the burgeoning population. Not only is there a problem in providing sufficient amounts of food, but there is a problem in getting the food to the population in a safe, palatable form. For centuries man has dealt with the problem of preserving food and the methods employed to preserve foods, particularly those of high protein content. Foods such as meat, fish and vegetable protein are particularly susceptible to microbiological contamination and enzymatic breakdown. Therefore, they must be carefully handled in order to avoid spoilage during storage or transit. For example, they may be refrigerated, cooked, dried, smoked, salted, packaged in sterile hermetically sealed packages, canned, coated with or immersed in an anti-bacterial or anti-mycotic media, or treated with antiobiotics. All of these methods, however, have practical limitations; for instance, refrigeration is not available in many places. Where available, it is expensive. Drying, salting or smoking change the physical or taste characteristics of the food so processed. Furthermore, many of these methods are of limited value in protecting food products against microbiological degradation and enzyme action without refrigeration.

It would be desirable to provide a method of processing foods such as meat, fish, vegetables and fruit, wherein resulting products retain many of the desirable characteristics of untreated food materials. In particular, the processed product should possess substantially the same textural or fibrous characteristics related to the natural moisture contents. The retention of these textural characteristics would make the processed product much more palatable to the consumer. The product resulting from such a process could be stored and marketed in a nonrefrigerated condition for extended periods of time. Ideally, such a process would result in a novel food product characterized by a high degree of palatability, high nutritional value, and the faculty of being stored and marketed in a non-refrigerated condition and in a non-sterile environment.

It has been known in the prior art to use certain polyhydroxyl compounds to aid in the preservation of food. Among the compounds most commonly used for such work is propylene glycol. This compound has been disclosed (among others) in U.S. Pat. No. 3,202,514 to be useful in giving bacteriostatis protection to an animal food. The compound has also been used to coat the surfaces of foods and thereby prolong their storage life under conditions of shipment or storage. Such a coating process is described in U.S. Pat. No. 2,532 489.

The chemical activity of such a material, i.e., its anti-mycotic activity, is well established. Moreover, it is non-toxic and would provide a highly suitable general preservative, except that, hitherto, there has never been a suitable process for effectively infusing the material into food products without:

a. a preliminary step which largely destroys the texture and/or fibrous nature of the product, as by pureeing or, b. failing to achieve an infusion of the preservative throughout the material being treated and, by such failing, allowing degradation processes to proceed at some distance below the surface of the food.

SUMMARY OF THE INVENTION

Therefore, it is an object of the invention to provide a process for making palatable food products being characterized by their retention of a surprising amount of original food texture and palatability.

Another object of the invention is to provide an effective process for preserving pieces of food against enzymatic and microbiological attack and other autolyptic processes so that they can be stored for long periods of time in a non-sterile atmosphere without becoming sites for excessive growth of bacteria.

It is a particular object of the invention to provide a process for preserving pieces of high-protein, fibrous-textured foods such as meat and fish.

Other objects of the invention will be obvious to those skilled in the art on reading the instant application.

In the process of the present invention, the food material to be processed is usually divided into pieces of desired size after which it is admixed with a dehydrating-preservative media. The food material, still containing its cell moisture, is immersed in dehydrating-preservative media and maintained in admixture therewith until the food product reaches the desired level of dehydration and preservative infusion. Then the food product is separated from the dehydrating-preservative mixture which now includes the water and any fat lost by the product during the treatment process. Excess liquid from the treating mixture is removed by any appropriate physical means such as pressing, washing, drying and the like.

The particular advantage of the invention is that significantly sized pieces of food ranging from fish fillets through carrot slices to granules of about 0.05 inches in average diameter or in their largest dimension can be effectively and quickly preserved with minimum loss of texture.

The process of the invention can be carried out at lower temperatures, say from about 10° to 55°C, when the preserving action is to be limited in scope. However, when the optimum degree of enzyme deactivation is desired, the processing temperature should be higher, up to about 90° to 120°C. An anti-mycotic agent is usually desirable at the lower temperatures, but very often can be dispensed with at temperatures at 90°C or higher.

In the present specification and claims, the term "proteinaceous food material" refers to the group consisting of meat and meat by-products, vegetable protein sources or mixtures of these. The term "meat" is understood to apply not only to the flesh of cattle, swine, sheep and goats, but also horses, whale and other mammals and poultry. "Fish" is meant to include such marine products as shrimp, crab, lobster, clams, oysters, and the like.

The term "vegetable protein source or concentrate" applies to oil seens and legumes. Typical of such vegetable protein sources are soybean, peanuts, etc., all of which terms are well understood and similarly defined or understood by said association.

Fruit and vegetable pieces are also suitably processed according to the invention. Apples and carrots are respectively examples of such pieces.

In the process of the present invention, optimum results are obtained if the proteinaceous food material is either porous, i.e. with interstices that can be penetrated by the dehydrating-preservative media and/or if it is divided into relatively small pieces. Pieces are preferred which have particle size such that a penetrating of the preservative of a distance of over 0.5 inch into the piece is not required. The use of larger pieces, particularly if the food material is not very porous, will usually require the use of longer contact periods between the food material and the dehydration-preservative media in order to achieve the desired degree of dehydration and preservation. Such longer contact periods, especially at high temperatures, can have a deleterious effect on the earlier-contacted outer portions of the food piece being treated.

The dehydration-preservative media, as employed in the present invention, comprises 1,3, propanediol or a mixture of 1,3 butylene glycol and propylene glycol. When a mixture of 1,3 butanediol and propylene glycol is employed, the butanediol to propanediol ratio can be from 1:1 to 1:10 with a ratio of from 05:1 to 1:5 being preferred.

The effective path which the preservative need traverse through a piece of food can be shortened by mechanical means, e.g. by piercing the piece with a series of closely spaced punctures, thereby effectively admitting the treating bath into the pieces and effectively diminishing the distance the treating liquid must penetrate during the treatment period. Also a pre-treatment with proteolytic enzymes, if carefully controlled to avoid excessive damage to the food, can provide a food piece which is more readily penetratable by the preservative. Other pre-treatment procedures can be utilized. For example, de-watering can be carried out, but any such de-watering must be by mild pressing, screening or the like. By "de-watering" we do not mean the removal of the natural cell-moisture content of the food as by heat drying techniques.

In addition, the dehydration-preservative media can contain a variety of substances that may enhance the dehydration or preservative processes. As previously stated, the supplementary ingredients include sugars, mineral salts, humectants, antioxidants, extenders such as cellulose esters and hydroxymethylcellulose, acidulants like citric acid, alkalyzers, firming agents, glycols, alcohols, chelating agents, and various antibacterial and anti-micotic agents. In general, the process of the invention aids the effective transport of such agents into the food pieces. For example, phosphates and chlorides of sodium and potassium, in quantities of 5 to 20 percent, by weight of the media, are useful.

The term "sugar" as it is employed in the present context is to be understood as meaning any of a number of useful saccharide materials. Included in the list of useful sugars are the non-reducing and reducing, water soluble mono-saccharides and the reducing and non-reducing polysaccharides and their degradation products, e.g. pentose, including aldopentoses, methylpentoses, ketopentoses, like xylose and arabinose; a dexyaldose like rhamnose, hexoses and reducing saccharides such as glucose, galactose and mannose; the ketohexoses, like fructose and sorbinose; disaccharides such as sucrose and other poly-saccharides such as dextrin and raffinose; sugar alcohols such as sorbitol, and hydrolyzed or modified starches which contain as their constituents oligosaccharides. The sugars are selected to be water soluble, thereby to offer a substantial effect in increasing the osmotic pressure of the treating solution.

Improved results can be obtained when the sugar is employed at concentrations of from 1 to 50 percent by weight of the dehydration-preservative media.

An anti-mycotic, when employed, is selected for stability in the particular medium employed and is conveniently added to the dehydration preservative media. Useful anti-mycotic agents include potassium sorbate, esters of the parabens (parahydroxy benzoate) such as propyl and methyl parahydroxy benzoates, benzoic acid, sodium benzoates, propionic acid, calcium sorbate, diethyl pyrocarbonate, menadione sodium bisulfite (vitamin k) and the like.

Ethyl alcohol can be added to the dehydration-preservative media as a means for increasing the hygroscopic nature thereof. While the amount of ethyl alcohol to be employed is not critical, good results are obtained when the ethyl alcohol is employed in an amount equivalent to from 10 to 80 percent by weight of the total dehydration-preservative media. The ethyl alcohol acts as both a dehydrating agent and preservative.

Glycerol has also been found to be beneficial as a component of the dehydration-preservative media. As in the case of ethyl alcohol and other additives the amount to be employed is not critical and depends largely on the particular food being processed and its intended use. Glycerol, when used, will usually be present in an amount equivalent to from 5 to 50 percent b weight of the dehydration-preservative media.

In carrying out the process of the present invention, a proteinaceous food material is contacted with a dehydrating-preservative medium comprising 1,3-butanediol or a mixture of 1,3-butanediol and 1,3-propanediol. The proportions of the dehydration-preservative media to the food material are not critical, with good results being obtained when the ratio by weight is from 5:1 to 10:1 with the most preferred range being about 5:1 by weight.

The food material and the dehydration-preservative media are maintained in intimate contact, at temperatures between 20° and 120°C, the latter temperature being attainable in an autoclave-contained process. The food material is typically admixed with the liquid dehydration preservative and the entire mixture is subjected to mild agitation to insure continual and intimate contact of the food material and the dehydration-preservative media. When higher temperatures, i.e. above about 40°C are used during the processing procedure, it is advantageous to partially dehydrate the food in the treating bath at a lower temperature, say 20° to 25°C, for some minutes before heating. Otherwise, some food materials will tend to break up excessively when first exposed to the higher temperature.

The food material and dehydration-preservative mixture are maintained in contact until the proteinaceous food material has undergone a net weight loss (primarily in water but some loss of fat is also involved) equivalent to from 20 to 80 percent of the original weight of the food material. It is the loss of a substantial portion of this water from the food material that causes the weight loss referred to above. The time required to achieve a weight loss (due to dehydration) of 20 to 80 percent of the original total weight of the food product will vary according to the type of food material being processed, the size of the pieces of food material being processed, the temperature of the dehydration-preservative media, the composition of the dehydration-preservative media, etc. In general, best results are attained with processing times of less than one hour.

Following the dehydration period, the dehydrated, preserved proteinaceous food product is separated from the dehydration-preservative media by a suitable technique such as screening, filtration or centrifugation. After the dehydrated food product is separated, it is generally still coated with the dehydration-preservative media. Further amounts of the dehydration-preservative media can be removed by conventional procedures such as pressing, washing with an organic solvent, washing with water, heating, forced air drying, vacuum drying, etc. While this last drying step is not critical, it is often useful to remove excess dehydration-preservative media to make the product free of glycol taste and flavor and thereby more palatable to the consumer.

The product obtained as a result of the process of the present invention can now be packaged in bulk or in smaller portions and stored for extended periods without refrigeration. The product thus produced contains from 2 to 30 percent by weight of 1,3 butylene glycol or a mixture of 1,3 butylene glycol, and the additives and supplements that have been mentioned above. The food pieces will be only about 20 to about 80 percent of their original weight at this point.

It will often be desirable to remove some or most of the dehydrating-preserving additives before use. Normally such removal can be accomplished by equilibration of the food pieces in water. Since the cells have been preserved in a relatively undamaged form, they present a minimum barrier to the transport of water in, and preservative out of, the food and a relative rapid and complete rehydration can be achieved.

ILLUSTRATIVE EXAMPLES OF THE INVENTION

In order to point out more fully the nature of the present invention, the following working examples are given as illustrative embodiments of the present process and products produced thereby.

EXAMPLE 1

One hundred parts by weight of carrot slices (about 0.125 inch thick and 1 inch in diameter) were placed in a vat with 500 parts by weight of a mixture comprising equal parts of propylene glycol and butylene glycol. The mixture was heated to 92°C over a period of about 10 minutes and held at 92°C for cooking during a subsequent 20-minute period. A gentle stirring action, sufficient to maintain distribution of the carrots in the glycol mixture, was maintained during the cooking period.

During the cooking period at 95°C, samples were removed and tested for water content. The ultimate level of dehydration was reached after about 10 minutes at 95°C. The weight of the treated carrots at this point was about 75 percent of their original weight.

The carrots were removed from the bath, cooled, dried of any excess liquid treating solution and sealed in a plastic bag at room temperature. The bags had been pre-sterilized, but only for the purpose of providing a known reference point for testing for bacteria during storage.

After 6 months' storage in these bags, the carrots were washed and heated in water (again, about five times the mass of carrots being treated), softened and had approximately the texture of fresh-cooked carrots. The carrots were safe and highly edible.

Samples of the carrots were taken from time to time during storage and standard tests for presence of bacteria were indicative of no substantial microbiological growth during the storage period.

EXAMPLE 2

The same procedure as described in Example 1 is used to cook and preserve fish fillets of about 0.5 inches in thickness, 3 inches wide and 4 inches long. The weight loss of the treated fish was about 50 percent after 20 minutes.

The resultant fillets were stored at room temperature in plastic bags for 6 months. When removed, they were heated in 600 grams water per 100 grams of fish.

The resultant product had the texture and taste of fish and was entirely safe for consumption.

EXAMPLE 3

The procedure of Example 2 was followed but, in addition to the mixture of glycol, the treating solution contained 5 percent of salt and enough citric acid to reduce the pH to 2 to 3. The salt aids in maintaining the structural integrity of the food pieces when processed at low pH, and in enzyme destruction. The citric acid aids in flavor maintenance and bacterial control.

Use of citric acid allows somewhat lower levels of glycol concentration.

EXAMPLE 4

The process of Example 2 was repeated except that instead of fish fillets, the fish was in the form of a loosely ground material having an average size of just above 0.05 inches in diameter, and the cooling temperature was 25°C. Moreover, an anti-mycotic agent, sodium propionate, and 5 percent by weight of the food of sodium chloride (and sugar) were included in the bath in a quantity equaling 0.1 percent of the weight of the food product. After six months storage in plastic bags at 25°C, the product was a palatable, fish-textured material highly suitable for incorporation into chowder, fish patties and the like.

EXAMPLE 5

One part by weight of material produced according to Example 4 was mixed with one part of dehydrated potato and one part of powdered milk, some salt and an anti-mycotic agent, then compressed into pills about an inch high and one inch in diameter. The pills were readily dispersed into water to make a cup of an entirely safe, highly edible fish chowder after storage for six months in plastic bags at room temperature.

It is, of course, to be understood that the foregoing examples are intended to be illustrative and that numerous changes can be made in the reactants, proportions, and conditions set forth therein without departing from the spirit of the invention as defined in the appended claims.

What is claimed is:

1. A process for preserving pieces of food material comprising the steps of:
   a. Immersing said food pieces, while they still comprise their cell-moisture content, into a liquid treating medium consisting essentially of 1,3-butanediol or a mixture of 1,3-butanediol and 1,3-propanediol;
   b. Simultaneously dehydrating said food pieces and infusing said treating medium into said food pieces while they are immersed in said treating medium to achieve a net weight loss between about 20–80 percent, said steps of immersing and dehydrating the food pieces being carried out at a temperature of from about 40°–120°C and the treatment time being less than about one hour;
   c. Removing said food pieces from said treating medium; and
   d. Removing any excess residual liquid-treating medium from the surface of said food pieces to provide food pieces containing infused therein from about 2.0 to 30 percent by weight of said 1,3-butanediol or of 1,3-butanediol and 1,3-propanediol mixture.

2. The process of claim 1 wherein said food pieces are at least about 0.05 inches in their largest dimension.

3. The process of claim 1 additionally comprising the step of partially dehydrating said food pieces in said liquid treating medium at about 20°–25°C prior to heating to prevent break-up of the food pieces during processing.

4. The process of claim 1 wherein the proportion of treating medium to food material is from 2:1 to 10:1 by weight.

5. The process of claim 1 wherein said steps of immersing and dehydrating the food material are carried out at a temperature of about 90°–120°C.

6. The process of claim 5 additionally comprising the step of partially dehydrating said food pieces in said liquid treating medium at about 20°–25°C prior to heating to prevent break-up of the food pieces during processing.

7. A process as defined in claim 1 wherein said food pieces are of such shape and size that no parts of said pieces are more remote than 0.5 inches from said treating medium.

8. A process as defined in claim 1 wherein said treating medium comprises at least about 5 percent of a soluble, osmotic-pressure modifying agent.

9. A process as defined in claim 8 wherein said modifying agent is a sugar or salt.

10. A process as defined in claim 8 wherein said treating medium comprises, in solution therewith, a hygroscopic agent selected from the group consisting of ethanol and glycerol.

11. The process of claim 1 wherein said liquid treating medium comprises a mixture of said diols wherein the ratio of 1,3-butanediol to 1,3-propanediol is from 1:1 to 1:10 by volume.

12. The process of claim 1 wherein said pieces of food material are pierced prior to the immersion step.

13. The process of claim 1 wherein the treated food material is equilibrated in water prior to consumption for removal of the additives and for rehydration of said food pieces.

* * * * *

UNITED STATES PATENT AND TRADEMARK OFFICE
CERTIFICATE OF CORRECTION

PATENT NO. : 3,904,774
DATED : September 9, 1975
INVENTOR(S) : Henry A. Dymsza

It is certified that error appears in the above-identified patent and that said Letters Patent are hereby corrected as shown below:

[56]  References Cited
      UNITED STATES PATENTS
      The following patents should be included in the references of record:

| | | | |
|---|---|---|---|
| 3,732,112 | 5/1973  | Frankenfeld et al. | 426 |
| 3,425,848 | 2/1969  | Camirand           | 426/305 |
| 3,667,965 | 6/1972  | Frankenfeld et al. | 426/151 |
| 3,202,514 | 8/1965  | Burgess et al.     | 426/106 |
| 2,437,150 | 3/1948  | Berg               | 426/146 |
| 2,420,517 | 5/1947  | Brandner           | 426/204 |
| 2,338,184 | 1/1944  | Kaufman            | 426/205 |
| 3,034,898 | 5/1962  | Kuhrt et al.       | 426/151 |
| 3,773,518 | 11/1973 | Frankenfeld et al. | 426/151 |
| 3,615,652 | 10/1971 | Burgess et al.     | 426/335 |
| 2,532,489 | 12/1950 | Ferguson           | 426 |

Col. 3, line 2 - "seens" should be -- seeds --.
Col. 3, line 26 - "1,3 propanediol" should be --1,3-propanediol--.
Col. 3, line 27 - "1,3 butylene glycol and propylene glycol" should be --1,3-butanediol and 1,3-propanediol--.
Col. 3, line 28 - "1,3 butanediol and propylene glycol" should be -- 1,3-butanediol and 1,3-propanediol --.
Col. 3, line 30 - "05:1" should be -- 5:1 --.

Col. 5, line 32 - "1,3 butylene glycol" should be -- 1,3-butanediol --.
Col. 5, line 33 - "1,3 butylene glycol" should be -- 1,3-butanediol --.
Col. 5, line 55 - "propylene glycol and butylene glycol" should be -- propanediol and butanediol --.
Col. 6, line 41 - before "size" insert --particle--.

Signed and Sealed this sixteenth Day of March 1976

[SEAL]

Attest:

RUTH C. MASON
Attesting Officer

C. MARSHALL DANN
Commissioner of Patents and Trademarks